United States Patent [19]
Belmares-Sarabis et al.

[11] Patent Number: 4,954,883
[45] Date of Patent: Sep. 4, 1990

[54] INTERWEAVE PICTURE COMPARISON APPARATUS AND METHOD

[75] Inventors: Armand Belmares-Sarabis, Catskill, N.Y.; Stanley J. Chayka, Parsippany, N.J.

[73] Assignee: Corporate Communications Consultants, Inc., Fairfield, N.J.

[21] Appl. No.: 257,647

[22] Filed: Oct. 14, 1988

Related U.S. Application Data

[60] Continuation-in-part of Ser. No. 150,626, Feb. 1, 1988, which is a division of Ser. No. 943,298, Dec. 17, 1986, Pat. No. 4,763,186, which is a continuation-in-part of Ser. No. 851,164, Apr. 14, 1986.

[51] Int. Cl.⁵ ........................ H04N 9/76; H04N 5/265
[52] U.S. Cl. ..................................... 358/22; 358/105; 358/106; 358/183
[58] Field of Search ................... 358/22, 183, 105, 106

[56] References Cited

U.S. PATENT DOCUMENTS

| | | | |
|---|---|---|---|
| 3,114,797 | 12/1963 | Williams | 358/105 |
| 3,530,234 | 9/1970 | Fenton | 358/183 |
| 3,673,317 | 6/1972 | Newell et al. | 358/82 |
| 3,683,111 | 8/1972 | Southworth | 358/105 |
| 4,179,704 | 12/1979 | Moore et al. | 358/105 |
| 4,608,598 | 8/1986 | Murakami et al. | 358/183 |
| 4,675,725 | 6/1987 | Parkyn | 358/183 |
| 4,680,643 | 7/1987 | Horiguchi | 358/183 |

FOREIGN PATENT DOCUMENTS 131176  8/1982  Japan ................................ 358/22

Primary Examiner—John W. Shepperd
Attorney, Agent, or Firm—Curtis, Morris & Safford

[57] ABSTRACT

Video signals from two different sources are interwoven with one another so that segments of one picture are intermixed evenly with segments of another picture. It is preferred that the segments be interwoven in a checkerboard pattern, with at least one pixel from each picture forming adjacent elements in the pattern. In one embodiment using a pattern in which only one pixel forms each element, a selected image in one frame of a video program can be readily aligned with the same image appearing in a different frame. Both images are visible simultaneously. The zoom and/or horizontal and vertical pan control on a telecine or other video signal source then can be used to match and align the images in size and position. In another embodiment, the checkerboard squares of the interweave pattern each can be made large enough to be seen by the naked eye. Then two images which are interwoven can be compared in their color characteristics, and one of the images can be color corrected to match the color of the other, thus greatly facilitating color matching. It is preferred that one of the video frames being compared be from an active video source such as telecine or tape player, and other be taken from digital memory. Preferably, both signals pass through the same processing circuitry so as to avoid differential degradation of the signals.

18 Claims, 9 Drawing Sheets

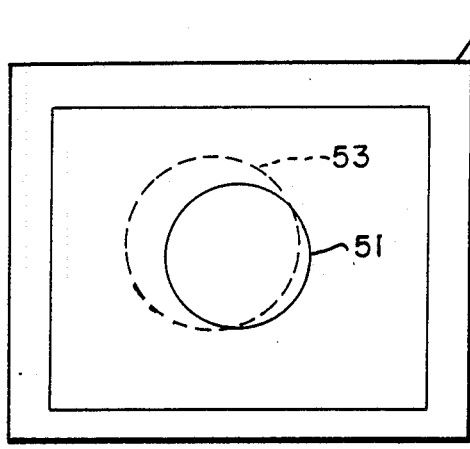
FIG. 5A
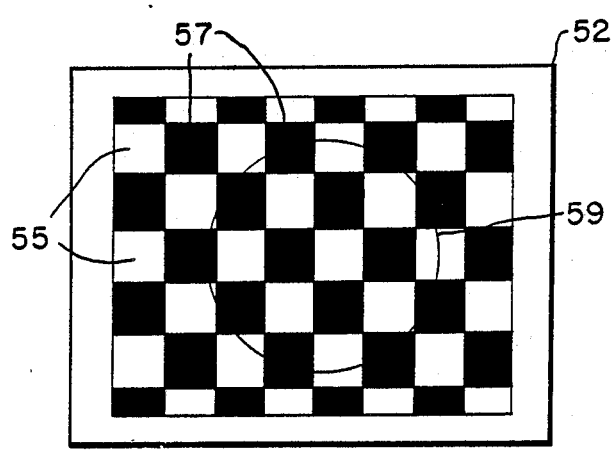
FIG. 5B
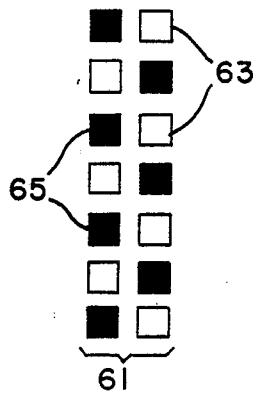
FIG. 5C
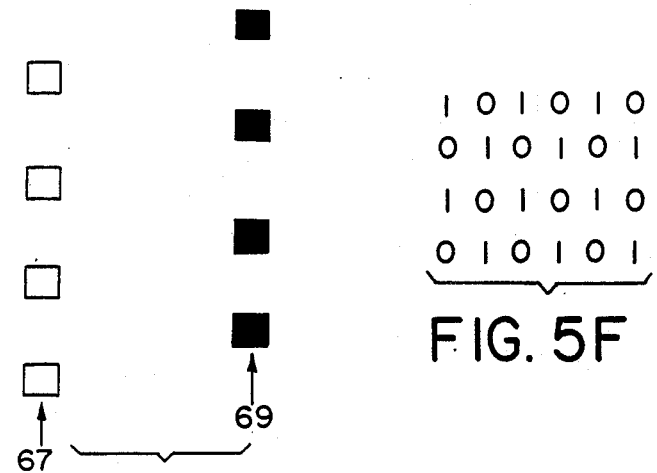
FIG. 5D
FIG. 5F
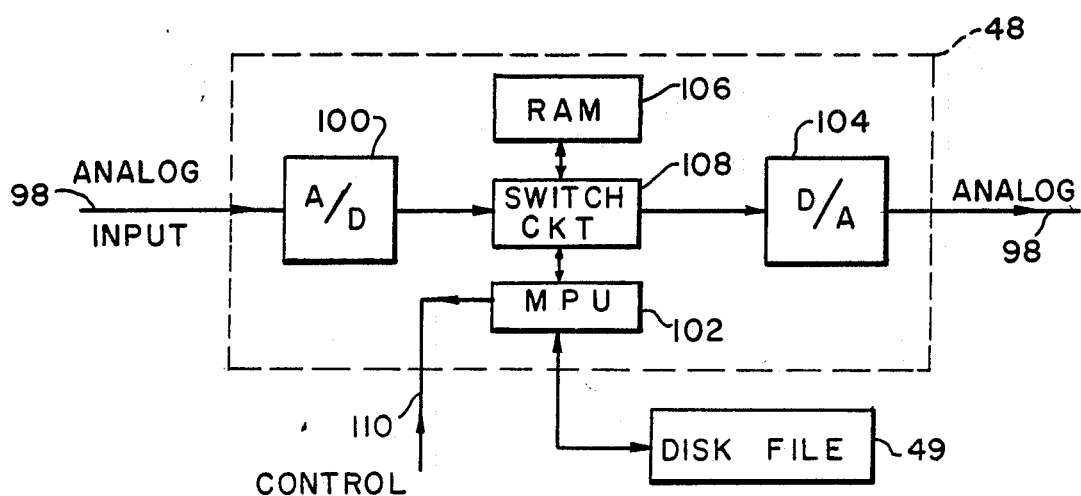
FIG. 5E

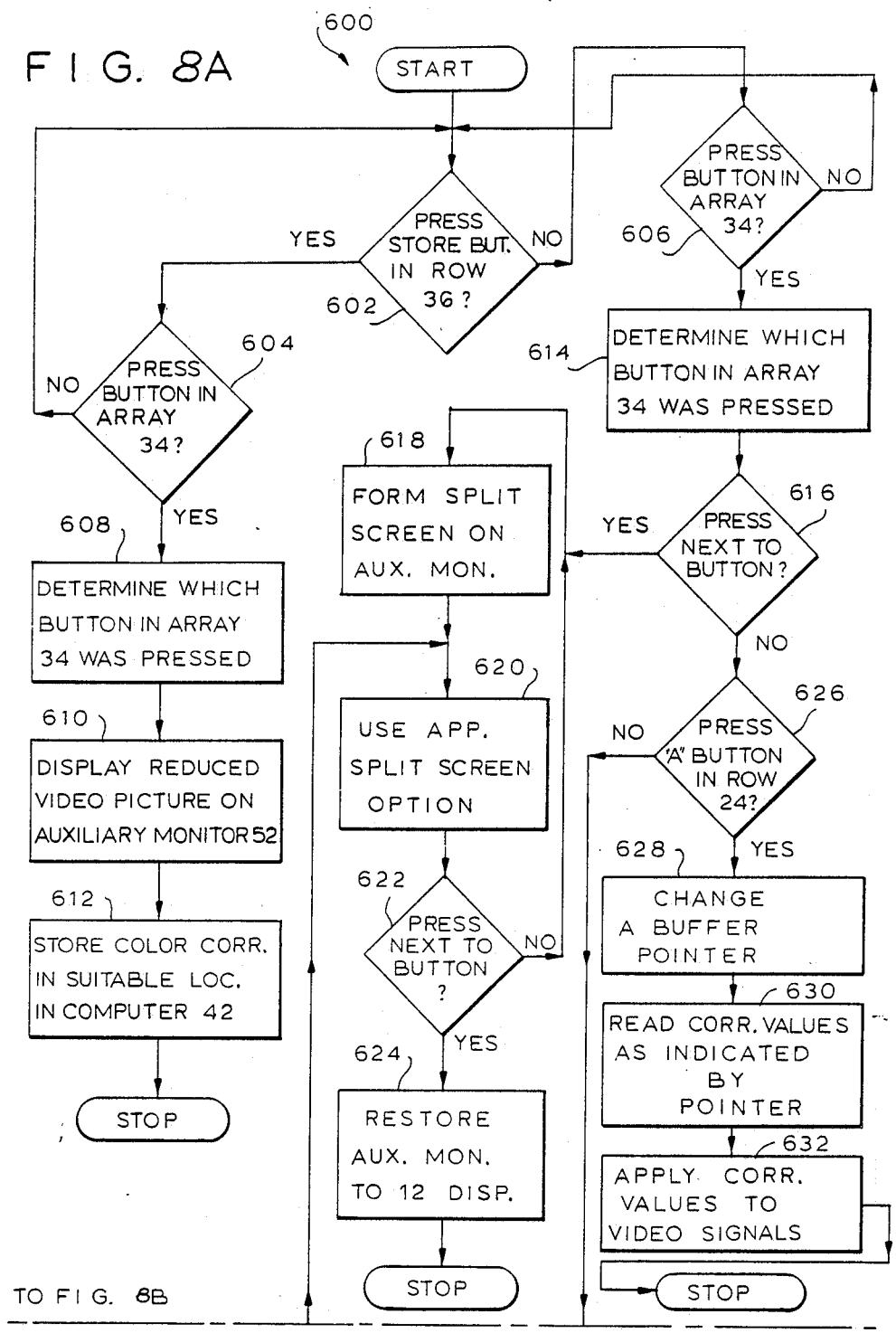

INTERWEAVE PICTURE COMPARISON APPARATUS AND METHOD

This application is a continuation-in-part of U.S. patent application Ser. No. 150,626 filed Feb. 1, 1988, which is a division of application Ser. No. 943,298 filed Dec. 17, 1986, now U.S. Pat. No. 4,763,186, which was a continuation-in-part of application Ser. No. 851,164, filed Apr. 14, 1986.

This invention relates to video picture comparison means and methods, and particularly to such means and methods as used in video post-production procedures, such as editing, film-to-tape and tape-to-tape transfers, special effects, color correction, etc.

There is a need for efficient and easy-to-use means for comparing video pictures. Comparison of video pictures is frequently needed in editing, special effects, color matching, and other video post-production procedures.

For example, in editing, it is frequently desired to compare one frame with a prior frame in order to select a particular frame of footage being edited so that it matches the positioning of objects in prior footage.

As another example, in creating certain special effects, such as insertions by use of chroma key circuits, it is highly desirable to insure that an object appearing in one scene or frame is accurately aligned with another image in the frame and is of the same size as the same image appearing in a prior frame. If it is not, the picture elements will be misaligned and/or of the wrong size after the insertion has been made, and the resulting pictures may be unacceptable.

Another use for picture comparison means is in color matching. Often it is desired to match the color of an object in one scene or frame to that of the same object or similar object in another scene or frame, or to match the color to a color standard.

Comparison devices which have been proposed prior to this invention and the inventions of the above-identified applications and patent generally have been less than satisfactory in that they tend to be cumbersome and slow to use, and lacking in the ability to compare images by locating corresponding parts very close to one another.

Accordingly, one of the objects of the present invention is to provide video image comparison means and methods which alleviate the above-identified shortcomings from the prior means and methods. A further object of the invention is to provide video picture comparison means in which corresponding images from different frames or scenes can be positioned very close to one another to greatly facilitate comparison of the two images. It is another object to provide means for modifying at least one of the images to match it to the other in terms of position, color, or other desirable parameters.

In accordance with the present invention, the foregoing objects are met by the provision of an apparatus and method for video picture comparison in which video signals from two different sources are interwoven with one another so that segments of one picture are intermixed evenly with segments of another picture. It is preferred that the segments be interwoven in a checkerboard pattern, with at least one pixel from each picture forming adjacent elements in the pattern.

In one embodiment using a pattern in which only one pixel forms each element, a selected image in one frame of a video program readily can be aligned with the same image appearing in a different frame. Both images are visible simultaneously. The zoom and/or horizontal and vertical pan control such as that which is provided on a telecine or other video signal source, then can be used to match the images in size and position. Accurate alignment is valuable in making accurately located insertions, and in editing and other functions.

In another embodiment, the checkerboard squares of the interweave pattern each can be made large enough to be seen by the naked eye. Then two images which are interwoven can be compared in their color characteristics and one of the images can be color-corrected to match the color of the other, thus greatly facilitating color matching.

It is preferred that one of the video frames being compared be from an active video source such as telecine or tape player, and other be taken from digital memory. preferably, both signals pass through the same processing circuitry so as to avoid differential degradation of the signals.

In accordance with a further aspect of the present invention, the equipment used for performing the above procedures also can be used to display multiple picture images side-by-side on a single display where they can be compared. Preferably, two pictures to be compared can be displayed side-by-side. It also is preferred that the signals for one of the pictures be converted, by suitable processing means, into a form suitable for storage, and stored.

The stored signals then are retrieved and displayed with a picture whose signals are processed by the same processing means so as to avoid differential degradation of the signals being compared. Preferably the storage device is a digital memory and the processing means includes analog-to-digital conversion means.

Color correction of one of the images can be affected, if needed, by the use of features of the color corrector disclosed herein.

In accordance with a another aspect of the invention, the color corrections for a particular scene are identified or labeled with a video picture from that particular scene. The video picture is displayed for the operator, preferably on an auxiliary monitor screen, or on the main monitor screen. The operator may use the display to recall the color corrections for that particular scene and apply them to the video picture signals for the present scene. Several video pictures may be shown on the same display, and the operator may utilize an array of pushbuttons arranged like the video pictures on the screen or a light pen in order to choose the color corrections to be recalled.

Alternatively, the display may include a "touch screen", and the operator may touch the video picture associated with the desired color corrections in order to recall them. Numerical data giving locations of the corrections for prior scenes preferably are displayed next to the pictures on the auxiliary display. Thus, the operator also can use the numerical correction location information displayed next to each picture to retrieve the associated correction values. The operator does not have to remember the scene number for the particular scene, which may change as the motion picture film or the videotape is edited. This aspect of the invention enables the operator to readily identify, locate, and recall the color corrections he or she desires to work with. Therefore, this aspect of the invention greatly increases the speed with which a motion picture film or a videotape may be color corrected.

The foregoing and other objects and advantages of the invention will be set forth in more apparent from the following description and drawings.

BRIEF DESCRIPTION OF THE DRAWINGS

FIGS. 5A–5F are front elevation views of monitor screens or portions thereof illustrating the unique picture interweave picture comparison feature of the invention;

FIGS. 6, 6A–6C are schematic diagrams of the main and auxiliary monitors using the "Call-A-Picture" feature of the invention; and FIGS. 7A, 7B, 8A, and 8B are flow charts of steps in computer programs which may be employed to implement the "Call-A-Picture" and picture comparison features of the invention.

GENERAL DESCRIPTION

Figure 1:
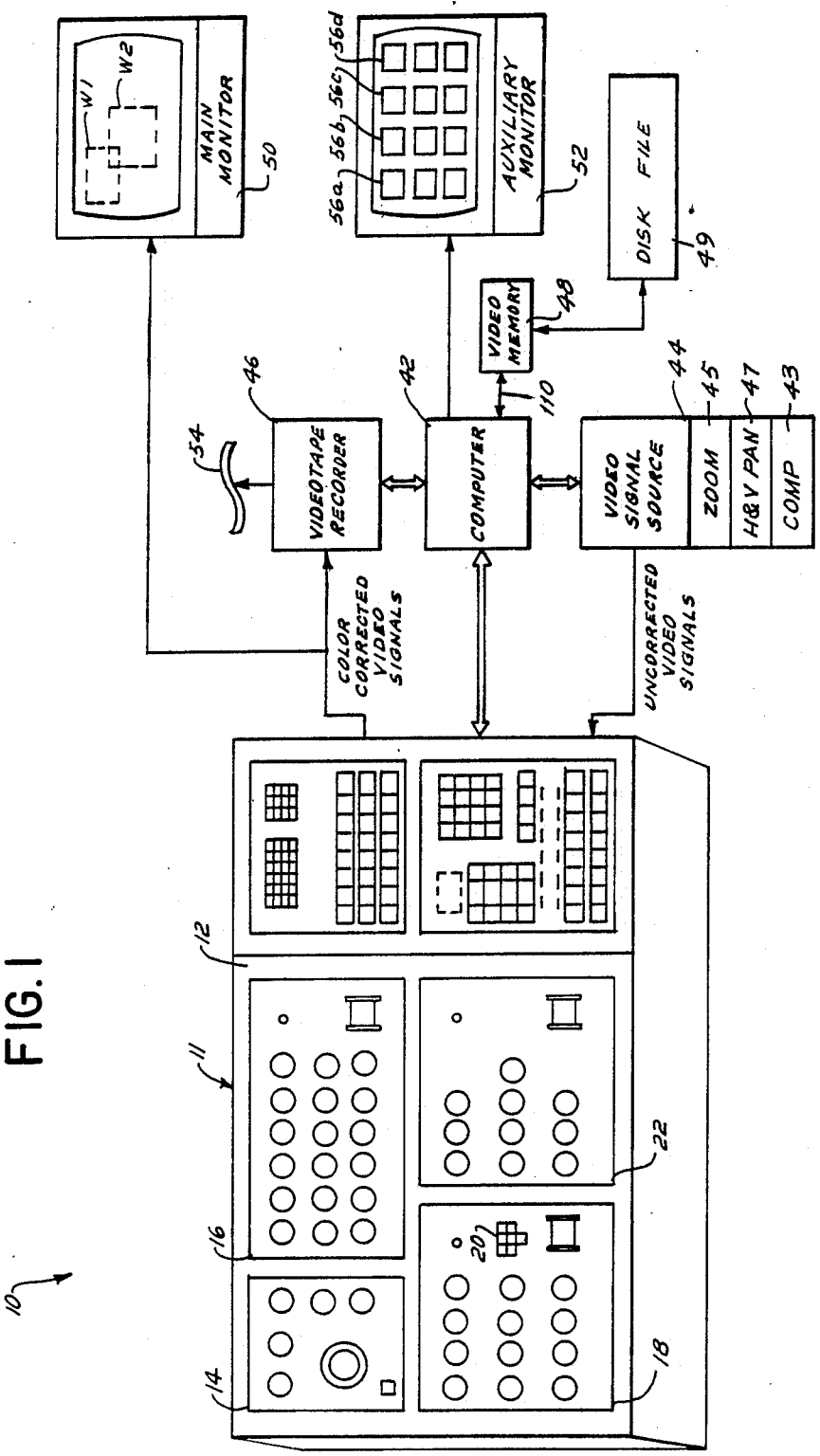
FIG. 1 is a schematic diagram of a film-to-tape or other video signal processing system utilizing the invention.

FIG. 1 shows a color correction system 10 constructed according to the invention. The color correction system 10 includes a color corrector 11 having a front panel 12. Portions of the front panel 12 are illustrated in greater detail in FIGS. 2 through 4. The front panel 12 has a set of variable vector controls 14 and a set of six vector controls 16. The six vector controls 16 function as outlined in the Rainbow and Luminance patents.

Figure 2:
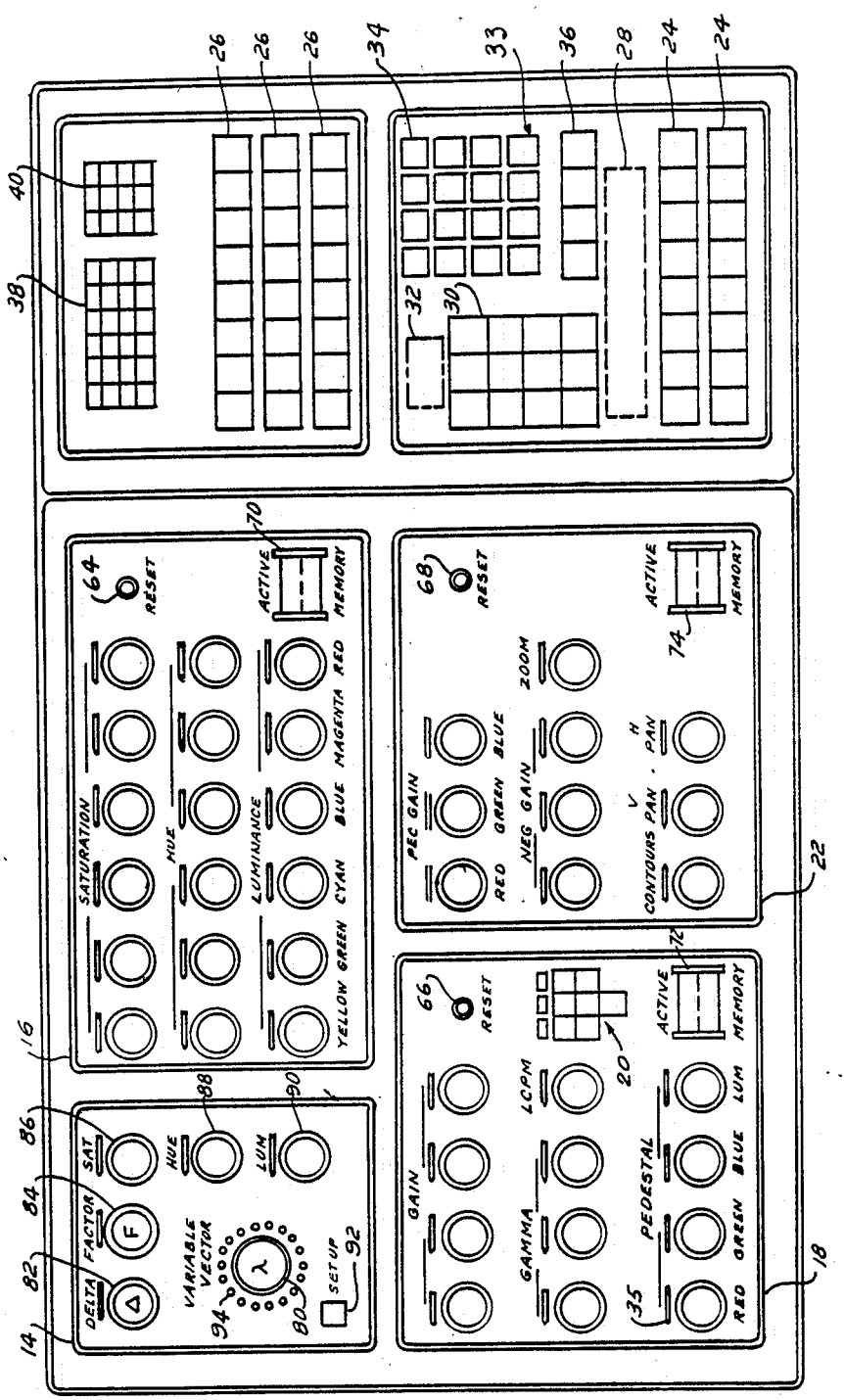
FIG. 2 is a front elevation view of the front panel of the color correction unit shown in FIG. 1.

Referring now to the lower left-hand portion of FIG. 2, the front panel 12 includes a set of color balance controls 18 and "window" controls 20. The "window" controls 20 are described and depicted in greater detail in U.S. Pat. No. 4,679,067 as well as U.S. Pat. No. 4,694,329. The front panel 12 additionally includes video signal source controls 22. The video signal source controls 22 adjust parameters such as the PEC gain and negative gain for each of the red, green, and blue channels. Moreover, the video signal source controls adjust other parameters, for instance, the horizontal pan, the vertical pan, the zoom, and the contours. Each of the controls in the sets of controls 14, 16, 18, and 22 includes a control knob which is coupled to a shaft-position encoder, as described in U.S. Pat. Nos. 4,679,067 and 4,694,329.

The right side of the front panel 12 includes pushbuttons and displays. Specifically, this portion of the front panel includes two rows of pushbuttons 24, which are shown in greater detail in FIG. 4, and three rows of pushbuttons 26, which are shown in greater detail in FIG. 3. The functions of many of these pushbuttons are described in the "Rainbow" U.S. Pat. No. 4,096,523 and the "Luminance" U.S. Pat. No. 4,410,908. A display 28 (FIG. 4) shows the scene number for the color corrections stored in the A buffer and the B buffer. Moreover, the display 28 shows the scene number for the current scene.

Figure 4:
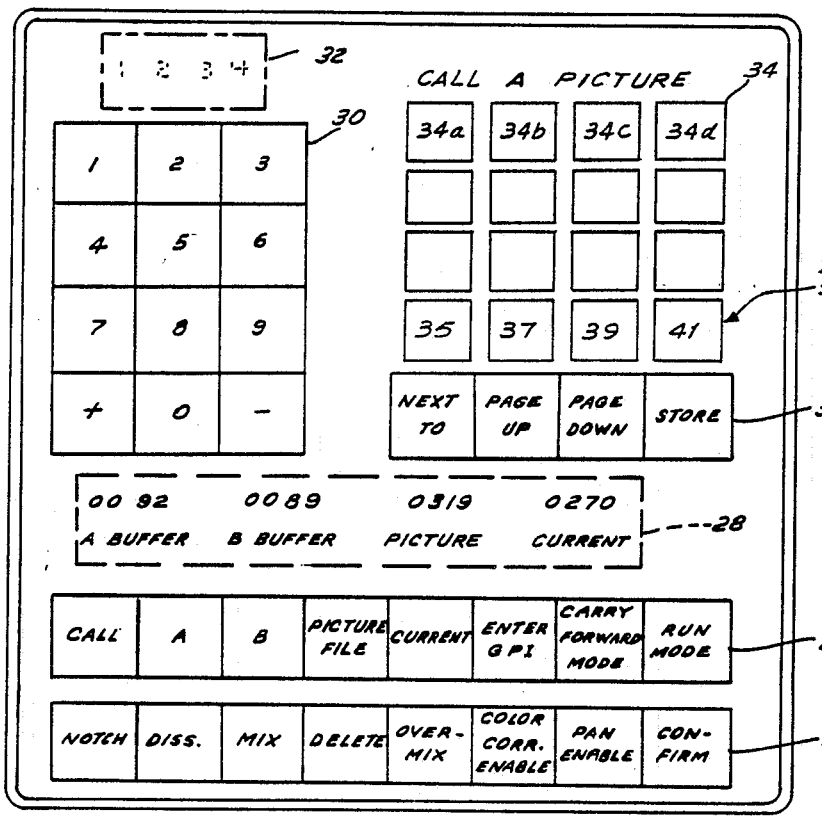

Still referring to FIG. 4, a keypad 30 and a display 32 are used to recall the color corrections for a particular scene and apply them to the present scene. For example, if the operator wanted to use the color corrections for scene number 1,234 for the current scene, the operator would press the "call" pushbutton in the upper one of the rows 24 and then the buttons 1, 2, 3, and 4 of the keypad 30 in this sequence in order to recall the desired color corrections.

Also shown in FIG. 4 is an array 34 of pushbuttons and a row of pushbuttons 36 for use in the "Call-A-Picture" feature of the invention, which feature is used for recalling color correction signals for previous scenes in another manner. Also shown in FIG. 4 is a row 33 of pushbuttons 35, 37, 39 and 41 used in the interweave comparison of video images in accordance with the invention. The operation of the "Call-A-Picture" feature and the interweave comparison feature will be described in detail below. The portion of the front panel 12 shown in FIG. 3 has waveform pushbuttons and indicators 38 for selecting various waveforms for viewing on an oscilloscope (not shown) as well as monitor selector pushbuttons and indicators 40 for selecting various signals for monitoring.

Referring again to FIG. 1, the system 10 has a computer 42, which is connected to each of the color corrector 11, a video signal source 44, a videotape recorder 46, a video memory 48, and a disk file 49. The video signal source 44 may be a film chain or telecine, a videotape player, or the like. The video signal source 44 produces video signals from the associated image recording medium. These video signals are delivered to the color corrector 11 so that they can be corrected. The color corrector 11 provides color corrections for the video signals from the video signal source 44 under the direction of the operator and the computer 42, and it produces color corrected video signals. The color corrected video signals are sent to a main monitor 50, and, at the appropriate time, to the videotape recorder 46. The operator may observe the effect of the color corrections on the video signals by looking at the video picture on the main monitor 50. The videotape recorder 46 records the color corrected video signals on a videotape 54, usually during a second run after color corrections have been made during a first run, thereby producing a color corrected videotape.

The main monitor is shown with windows W1 and W2. The use of the windows W1 and W2, which are movable in size and/or position, is described further below.

An auxiliary monitor 52 is connected to the computer 42. The auxiliary monitor 52 displays a plurality of video pictures, such as the video pictures 56a–56d. The function of the auxiliary monitor 52 and the video memory 48 and the disk file 49 are described below during the discussion of the "Call-A-Picture" feature.

Referring now to FIG. 2, above each of the control knobs in the sets of controls 14, 16, 18, and 22 is a horizontal linear group 35 of four light-emitting diodes ("LEDs"), which are referred to as "rangefinder" LEDs. The two inner LEDs of each group 35 are green, while the two outer LEDs are red. When the associated control knob is in its center position, the two inner LEDs are energized. Correspondingly, if the control knob is turned to the left, the rightmost and two inner LEDs are deenergized, and the leftmost LED is energized. Accordingly, the operator may quickly determine the position any of the control knobs.

Reset buttons 64, 66, and 68, are provided to permit the operator to readily center the control knobs in the sets of controls 16, 18, and 22, respectively. Specifically, the operator presses a reset button, and all of the control knobs in the associated set of controls are electronically centered by zeroing the counter connected to the control knob. The controls 16, 18, and 22 include active memory pushbutton-indicators 70, 72, and 74, respectively.

Referring now to the lower part of FIG. 4, the "notch" pushbutton sets the scene boundary between scenes; that is, pressing the "notch" button stores the frame number of the first frame of a new scene. The "color correct enable" pushbutton in the same row makes the "notch" pushbutton effective for color correction events. The "pan enable" pushbutton makes the "notch" pushbutton effective for position related events, such as horizontal pans, vertical pans, and zooms.

The "carry forward mode" is entered by pressing the "carry forward mode" pushbutton in the upper row 24. In this mode, the color corrections from the last scene are carried forward for the next scene. That is, once the operator establishes color corrections for a particular scene and then sets the scene boundary between that scene and the next scene, these color corrections are both stored for the particular scene and applied to the next scene. Thus, the operator may use these color corrections as a basis for color correcting the next scene.

The "picture file" pushbutton is used with the video scene recall feature, i.e., the "Call-A-Picture" feature of the invention, and the interweave comparison feature, which are described below. The "picture file" pushbutton enables the array of pushbuttons 34 and the rows of pushbuttons 33 and 36.

The "diss." or "dissolve" pushbutton in lower row 24 is used to produce a linear transition between the color corrections for a given scene and the color corrections for the subsequent scene. For example, the operator may make color corrections for a given scene and then make color corrections for the subsequent scene. If the operator wants a smooth transition between scenes, the operator presses the "dissolve" pushbutton at a frame near the end of the given scene and again presses the "dissolve" pushbutton at a frame near the beginning of the subsequent scene. The computer is programmed to automatically provide a linear transition, for instance, on a frame-by-frame basis, between the color corrections for the given scene and the color corrections for the subsequent scene for all frames between the two dissolve points.

Figure 3:
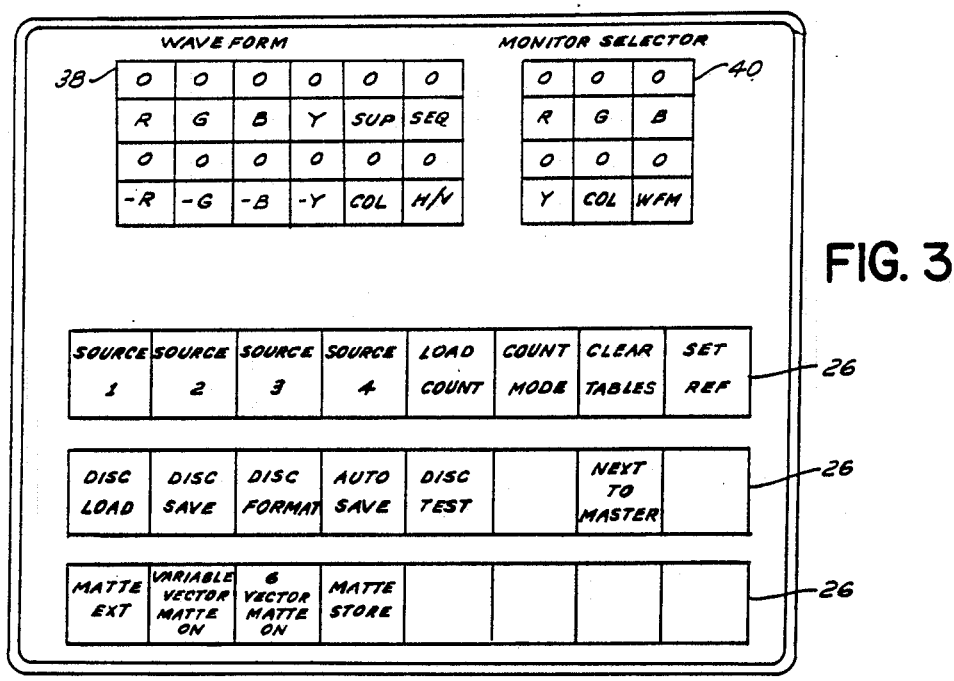
FIGS. 3 and 4 are enlarged views of portions of the front panel shown in FIG. 2.

The "source 1", "source 2", "source 3", and "source 4" pushbuttons, which are shown in row 26a of FIG. 3, enable the operator to select one of a variety of video signal sources. For example, the operator may select a telecine as the video signal source by pressing the "source 1" pushbutton, or select a videotape player as the video signal source by pressing the "source 2" pushbutton.

The "load count" pushbutton (next to the "source 4" button) allows the frame counter to be initialized to any number at the beginning of a new job. The "count mode" pushbutton allows the operator to select among various counting modes for the frame counter, such as, counts by hours, minutes, seconds and film frames; or PAL video frames; or NTCS video frames.

The "matte ext", "variable vector matte on", "six vector matte on", and "matte store" pushbuttons are described below during the description of the "Traveling Matte" feature of the invention.

The "disc load", "disc save", "disc format", "auto save" and "disc test" pushbuttons are utilized to control the disk file 49.

VARIABLE VECTOR CONTROLS

The upper left-hand portion of FIG. 2 illustrates the set of variable vector controls 14. The controls 14 include a variable vector position control 80, a delta control 82, a factor control 84, a saturation control 86, a hue control 88, and a luminance control 90. Furthermore, the variable vector controls 14 include a "set up" pushbutton 92, the function of which is described below. A ring of LEDs 94 is located around the circumference of the variable vector position control 80. The LEDs 94 indicate the angular orientation of the variable vector position control 80. The angular orientation of the variable vector position control 80 corresponds to one of the colors on a vectorscope.

The variable vector position control 80 is used to select a particular range of colors for color correction. The principal color within the range of colors is determined by the angular orientation of the variable vector position control 80. The variable vector position control 80 may be used to select any principal color within the precision of the associated counter. For example, if the associated counter is a 12-bit counter, any one of 4,096 different principal colors may be selected with the variable vector position control 80. Thus, the principal color is essentially infinitely variable The luminance control 90 may be used to increase or decrease the brightness of the colors within the selected range of colors. Of course, the luminance control 90, the hue control 88, and the saturation control 86 may be employed together to alter the associated parameters of the colors within the selected range of colors. The variable vector control knob 80 and the delta control knob 82 are utilized to set the selected range of colors, as noted above. The factor control 84 is used to select those colors within the selected range of colors that have saturation levels either above or below a specified level. The function of the factor control 84 is described in greater detail below during the description of FIGS. 10 and 11.

As an example of the use of the variable vector controls 14, the color correction of a particular scene will be described. Assume the operator desires to color correct a specific object, such as an apple appearing in a picture on the main monitor 50. The operator initially presses the "set up" pushbutton 92, which is part of the variable vector controls 14. This cases all portions of the picture which have colors within the nominal range of colors set by the variable vector position control 80 to become a neutral gray. If the apple does not become gray, the operator rotates the variable vector position control 80 until the apple becomes gray. If only a portion of the apple becomes gray because the apple contains colors outside of the selected range, the operator rotates the delta control to increase the delta or bandwidth of the selected range until the entire apple becomes gray. This signifies that the colors the operator desires to correct, i.e., the colors forming the apple, are encompassed within the selected range. The operator again presses the "set up" pushbutton 92, and the colors are displayed in an unaltered fashion.

Alternatively, the "set up" button may be connected so that objects with the selected color appear normally on the monitor while objects having other colors appear to be gray. The modifications to FIG. 7A that are necessary to implement this feature are readily apparent to a person having ordinary skill in the art and, therefore, will not be described in detail here.

Now, the operator may turn any or all of the saturation control 86, the hue control 88, or the luminance control 90 in order to adjust the corresponding parameter of the colors within the selected range of colors. For instance, the operator may rotate the hue control 88 to change the color of the apple from a greenish red to red. Once the operator has developed the color corrections with the controls 86, 88, and 90, the operator causes the color corrections to be stored in the computer 42. The storage and retrieval of the color corrections may be accomplished as described in the Rainbow patent. The color corrections are read from the memory in the computer and used to produce the color corrected videotape 54 during the "run" mode.

In this manner, the video picture signals forming the apple may be color corrected to produce a desirable image. With the variable vector controls, the apple may be segregated from any of the other objects in the picture and then color corrected. Accordingly, the variable vector controls permit greater object selectivity during color correction and speed the color correction procedure. That is, an object can be segregated from others having hues very close to that of the selected object, or even from objects having the same hue but a different saturation level. It is believed that the hue of the selected object can be closer to that of other similarly colored objects and still be effectively segregated for color correction purposes than with prior color correction devices. This not only improves the speed of color correction, but makes some color corrections possible for the first time, thus significantly improving the color correction quality.

VIDEO SCENE RECALL ("CALL-A-PICTURE") FEATURE

Referring now to FIG. 4, pushbuttons 34 and 36, together with the auxiliary monitor 52 shown in FIG. 1, may be used to implement the video scene recall or "Call-A-Picture" feature of the invention. This feature gives a miniature reproduction on the monitor 52 of a frame from each of several prior scenes which have been color-corrected. This allows the operator to visually select the prior scene whose corrections are to be recalled without running the telecine or tape player backwards or using slow prior methods.

Figure 6:
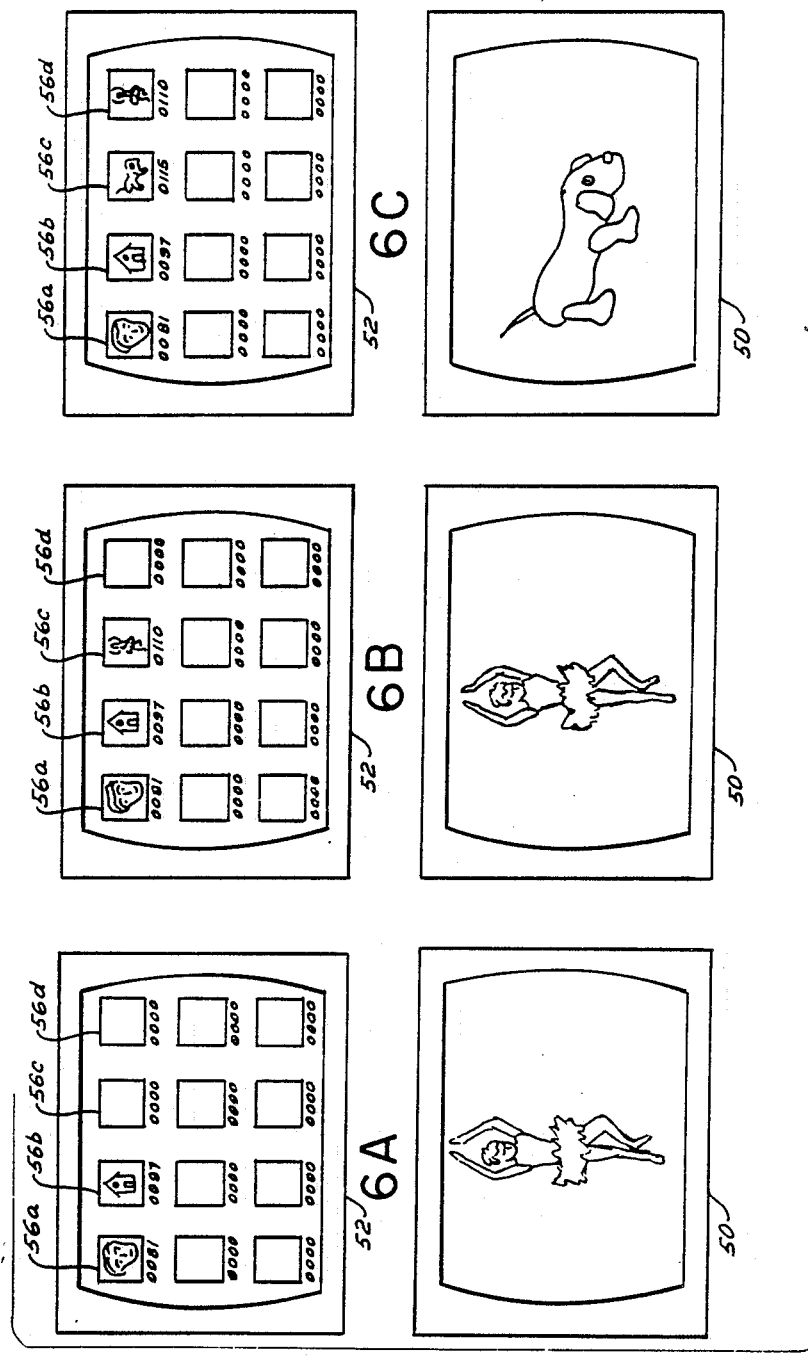

In the specific preferred embodiment shown in the drawings, the auxiliary monitor 52 displays up to twelve different video pictures, such as the video pictures 56a–56d shown in FIGS. 1 and 6. The twelve video pictures are displayed in an array with four columns and three rows. Each of the twelve video pictures corresponds to one of the twelve pushbuttons 34 shown in FIGS. 2 and 4. Each video picture is associated with the color corrections for the scene which includes that video picture, and each pushbutton 34 is associated with one of the video pictures. Specifically, the pushbuttons 34a–34d correspond to the video pictures 56a–56d, respectively. The pushbuttons correspond to the video pictures based upon their placement in the associated array.

When the operator desires to recall the color corrections for the scene with the video picture 56b, for example, the operator presses the pushbutton 34b, and those color corrections are recalled and applied to the output of the video signal source 44. The information for producing the video pictures on the auxiliary monitor is stored in the video memory 48. This information is recalled and directed to the auxiliary monitor under the control o the computer 42. The video memory 48 can be any commercially available video picture storage device The preferred device, which has been used successfully, is the model AT Vista Videographics Adaptor sold by American Telephone & Telegraph Corporation.

Now referring to FIG. 5E, the unit 48 includes an analog input terminal 96, an analog-to-digital convertor 100 to convert analog video signals into digital signals suitable for storage, a switching circuit 108, random access memory 106, a microprocessor 102 and a digital-to-analog convertor 104 which converts the digital video signals into analog signals suitable for modulation to make them into composite video signals suitable for display on a monitor. Control signals are received on line 110, and the microprocessor and disk file 49 are controlled in response to those signals. The control signals are received from the computer 42.

Video picture signals which are decided to be stored are stored in the disk file 49 and then retrieved from that storage medium and, under the control of the microprocessor 102 which operates the high speed switching circuit 108, these picture signals are delivered to the D/A convertor 104 for output and display on the monitor. The disk file 49 has, for example, a hard "Winchester" disk and 90 megabytes storage capacity.

The random access memory 106 contains approximately 4 megabytes of memory for use as a buffer store, as well as for the storage of the operating program for the various functions of the device 48.

INTERWEAVE VIDEO PICTURE COMPARISON FEATURE

The interweave video picture comparison feature of the invention is illustrated in FIGS. 5A through 5F of the drawings. The interweave comparison apparatus and method involves intimately comparing images from two different sources by interweaving segments of the picture of each in a pattern such that both images are displayed on the same monitor in overlapping relationship to one another. By this means, corresponding sections of the images can be compared accurately and easily due to their close proximity to one another on the screen. The invention is intended primarily for comparing similar or identical objects from different frames or scenes in a video program, but also can be used for comparing different objects and/or areas.

One purpose of the comparison system and method is to compare the position and size of two images. This is illustrated in FIG. 5A which is a representation of the main monitor 50 from FIG. 1 in use with the present invention. It should be understood that either the main monitor 50 or the auxiliary monitor 52 can be used for the comparison purposes here being described, by use of the control program described above and below for use with the Call-A-Picture feature of the invention.

Referring now to FIG. 5A, displayed simultaneously on the screen of the monitor 50 is a circular image 51 from a frame of a motion picture or video tape program previously stored in the disk file 49 and retrieved from that file for the purpose of display.

Also shown on the monitor screen is a similar circular image 53 from an active video source (telecine, tape player, etc.) from a subsequent frame of the same program. This image is shown in dashed outline in order to easily distinguish it from the image 51. However, it should be understood that the circle 53 actually will be displayed on the video as a solid line.

The circle 53 is supposed to be identical to the circle 51 and positioned in the same position. However, because of telecine drift or other instabilities in the recording and/or reproduction of the images, the circle 53 is larger than the circle 51 and is displaced upwardly and to the left of the circle 51.

It often is desired to align the images such as images 51 and 53 in each scene or frame of a program so that the images are accurately located relative to one another and to other images in the pictures when a finished video tape is recorded. The circles or other images can be so-called "cut-outs" for the insertion of other graphic matter. Often that graphic matter must be precisely aligned with other images in the picture, and must be of a constant size.

Referring again to FIG. 1, the video signal source 44 such as the telecine usually has a zoom control 45 and horizontal and vertical pan control devices 47. With the zoom control, the image 53, the signals for which are being delivered directly from the signal source 44 to the input 96, can be controlled by the zoom control of the telecine, etc., to reduce its size to that of the circle 51. The horizontal and vertical pan control the can be used to move the circle to the right and downwardly until it is aligned precisely with the circle 51. This can be done repeatedly for each scene or frame of a program to produce a video tape ready for insertion, or complete with desirably accurately positioned images. If desired, a horizontal or vertical compression control 43 can be used to compress or expand the image.

Another use of the alignment technique here under description is in selecting frames for use in the editing process. By the use of the invention, one among many different available images can be selected which aligns with a previous image. In such a procedure, repositioning or resizing is not needed.

The manner in which the two images 51 and 53 are superimposed upon one another now will be described. Referring to FIG. 5E, the signals from the active signal source are input on analog input line 96 and digitized by the convertor 100. The picture signals for the image 51 already have been digitized previously and stored in the disk file 49. In accordance with the present invention, an operating program is stored in the random access memory 106 to operate the switching circuit 108 in a manner such that it alternatingly samples the input from the convertor 100 and that from the picture storage unit 49 so that the output signal delivered on the output line 98 consists of a signal first from one of the pictures, then from the other, and then from the first one again, and so forth. Preferably, the segments of each picture are distributed evenly across the face of the screen in a checkerboard pattern such as that shown in FIGS. 5B and 5C.

When utilizing the invention for position and/or size matching as shown in FIG. 5A, it is preferred that each segment of the picture be a single picture element or "pixel". Individual pixels are shown in FIGS. 5C and 5D.

The digitizer 100 shown in FIG. 5E converts the analog signals into digital signals representing each pixel and passes the signals from input line 96 through the switch 108 when the switch is conditioned to do so.

Similarly, the image stored in the disk file 49 is stored as a plurality of bits representing the information in each pixel. Each pixel is represented by three eight-bit bytes, each byte representing the red or the green or the blue content of the video signals. The switching circuit 108 preferably comprises a multiplexor with enough lines to switch each of the bits.

The operating program which is stored in the random access memory 106 for operation of the switching circuit 108 preferably is simply an array of digital ones and zeros arranged in rows and columns according to the principles illustrated in FIG. 5F. As it can be seen, along each horizontal row, the stored code alternates starting with a one, having a zero in the next location, followed by a one, etc. Similarly, the code in each vertical column varies according to the same pattern. Thus, in the second row the first code is a zero, the next is a one, the next is a zero, and so on. The third row repeats the pattern of the first row.

There is one horizontal row of codes for each pixel in a horizontal line in the television field. The standard number of pixels per line is 780. The number of horizontal rows is equal to the number of scan lines in the field, being 525 for the NTSC system and 625 lines for the PAL system.

A pixel clock (not shown) controls the scanning through the memory to retrieve the codes shown in FIG. 5F in synchronism with scanning the signals from the stored picture and from the active picture input on line 96. Therefore, during each horizontal scan of the picture tube, each alternate pixel is derived from a different one of the pictures.

FIG. 5C shows an array 61 of two vertical columns of pixels 63 and 65. The white pixels 63 are from one of two images each of which has a vertical line two pixels wide, with the lines superimposed upon one another exactly.

FIG. 5D shows a vertical array of light pixels 67 and a vertical array 69 of dark pixels, each of which is from two different images forming parallel vertical lines spaced apart from one another. As it can be seen, only half of the pixels which normally would be available to define each of the two lines is actually used for form the line. Although this reduces resolution somewhat, it enables one to bring the two lines into registration by aligning the pixels 67 and 69. Since the human eye cannot resolve the individual pixels, both arrays will appear as individual lines, despite the absence of alternate pixels. Thus, to the human eye, the two images 51 and 53 in FIG. 5A will appear as two solid lines.

It is easy to detect when the two lines are made to coincide exactly, by appropriate adjustment of the position and size of the image 53. Thus, the invention provides highly accurate and easy to use alignment means for sizing and aligning and comparing images. This process and equipment is superior to those which merely display the images side-by-side on the side monitor since that does not make it possible to easily compare individual parts, sizes and locations of the images. Furthermore, the images 51 and 53 can be displayed in a larger size than in prior devices, for even better accuracy and ease of operation.

FIG. 5B illustrates another embodiment of the invention in which square arrays 55 and 57 of pixels from different ones of the sources, the active video source or the storage source, are combined in a relatively large checkerboard pattern on the monitor screen. The dark squares are from one source, and the light squares 55 are from the other source. A circular image 59 also is displayed on the screen. It is desired to match the color of the circle 59 to the color of an identical circle (not shown) in the stored image. The side-by-side display of relatively large segments 55 and 57 from different ones of the sources in an uniform pattern inside the boundaries of the circle makes it relatively easy to compare the colors. This is very useful for color matching in which it is desired to match the color of the image 59 from the active picture with that of the same object in the stored picture. The color correction controls described above in this patent application then can be used to correct the color until it matches the color of the stored object. If there are color variations within the image 59, this can be observed then the specific portion of the area to be corrected can be located within one of the windows W1 or W2 shown in FIG. 1 so as to limit the color correction to the area where it is specifically desired.

Each of the squares 55 and 57 of the checkerboard is formed of an array of pixels from one of the two sources. The operating program to do this is the same in principle as that shown in FIG. 5F. The difference is that each "one" in the code is replaced by a series of "ones", and each "zero" of the code is replaced by an equal number of "zeros".

The size of the squares in the checkerboard pattern can be varied as desired. Preferably, the smallest size square should be visible to the naked eye. A practical maximum size has been determined to be approximately ⅛ of the length of a full horizontal scan per square.

Referring now to FIG. 4, the pushbutton 35 is pushed to enable the interweave mode of operation. Selection of which monitor to be used is made by means described hereinafter in connection with the "Call-A-Picture" feature of the invention. Operating the pushbutton 35 enables the single pixel pattern illustrated in FIG. 5F. The operating program data is stored on the disk file 49 and is read into random access memory 106 upon an appropriate software command.

If desired, each of the other three pushbuttons, 37, 39 and 41, will select a different size for the checkerboard squares. Several suitable sizes might be 1/32, 1/16 and ⅛ of the width of the horizontal field. 1/64 of a horizontal field is somewhere near the practical minimum area readily seen by the naked eye.

It should be evident that the interweave embodiment of the invention also takes advantage of the use of a common signal processing path both for the active signal and the stored signal so as to avoid differential degradation of the two signals being compared on the monitor. However, this embodiment of the invention makes an additional advantage out of this arrangement, as compared with the "Call-A-Picture" feature, in that the digitizing of the active signal is used to great advantage to provide easily comparable segments of the two signals for simultaneously overlapping display. Thus, the digitizing process serves two purposes simultaneously.

VIDEO SCENE RECALL FEATURE

The video scene recall feature of the invention enables the operator to quickly and easily determine and recall particularly useful color corrections. The operator does not have to remember what scene corresponds to the contents of buffer A or what scene corresponds to the contents of buffer B. Moreover, the operator does not have to think of a name for the color corrections for a given scene and type it onto a display or write it down somewhere. This feature of the invention presents the operator with an easily recognizable label for specific color corrections. Thus, the operator is better able to recall and utilize previous color corrections. As a result, the time necessary for color correcting a videotape is shortened. The video scene recall feature is an alternative to the use of the "call" pushbutton and the keyboard 30 for recalling previous color corrections.

FIGS. 6A-6C show the main monitor 50 and the auxiliary monitor 52 on a larger scale than in FIG. 1. FIG. 6A illustrates the auxiliary monitor 52 after the operator has identified the color corrections for two previous scenes. The operator has used video pictures 56a and 56b for the identification of the color corrections. In particular, the operator has identified the color corrections for scene 0081 with a video picture corresponding to a person's face, and the operator has identified the color corrections for scene 0097 with a video picture corresponding to a house. A different video picture, i.e., a video picture from the current scene, is displayed on the main monitor 50 in FIG. 6A. The operator determine the color corner of FIG. 6. The operator determines the color corrections for the current scene, as set forth above and in the Rainbow patent, and now wishes to identify those color corrections for later use. The operator simply presses the "store" pushbutton, which is located in the row of pushbuttons 36 (FIG. 4), and then the operator presses the pushbutton 34c.

FIG. 6B illustrates what happens after the operator presses these pushbuttons. The picture on the main monitor 50 is displayed on the auxiliary monitor as the video picture 56c, which corresponds to the pushbutton 34c, and the scene number for the present scene, i.e., 0110, is displayed in the auxiliary display below the video picture 56c. At any later time the operator may press the pushbutton 34c, and the color corrections for scene 0110 will be recalled and applied to the then current scene.

The operator is not required to use the video pictures on the auxiliary monitor 52 and the pushbuttons 34 to identify the color corrections in any specific order. For example, the operator could have pressed the button 34d in order to identify the color corrections for the current scene. If the operator had done so, the video picture of the dancer would have been displayed in location 56d instead of location 56c.

FIG. 6C depicts a variation of the video scene recall feature of the invention. If the operator wishes to compare the color corrections for two given scenes, the operator may press the "next to" pushbutton, which is located in the row of pushbuttons 36 in FIG. 4. As an example, assume that the operator has identified the color corrections for three scenes 56a, 56b, and 56c, as shown by the auxiliary monitor 52 in FIG. 6B and that the operator has pressed the pushbutton 34b to apply the corresponding color corrections stored for scene 0097 to the current scene shown by the main monitor 50 of FIG. 6C. Now, the operator desires to compare the effect of the color corrections for the current scene, i.e., scene 0115, with the effect of the color corrections for scene 0097. The operator simply presses the "next to" pushbutton. As it is shown in FIG. 6C, the picture of the dog on the main monitor 50 is then displayed next to the picture for scene 0097 on the auxiliary monitor, and the picture that was in location 56c is automatically moved to location 56d. Consequently, the operator may readily compare the color corrections for scene 0097 with the color corrections for scene 0115 on the auxiliary monitor 52. If the operator wishes to examine the color corrections for these two scenes on a larger scale, the operator may use the "next to master" pushbutton, which is shown in FIG. 3, thereby causing the two video pictures to be displayed simultaneously side-by-side on the main monitor 50.

Of course, either video picture can be shown alone on the main monitor 50. The ability to thus display a prior scene or frame on the main monitor 50 without running the telecine or tape player back saves wear and tear on the film or tape and minimizes damage due to scratching.

As a further variation, it should be understood that the identification frames of prior scenes can be selectively called up from the video memory and displayed on the main monitor 50 instead of the auxiliary monitor. The array of identification frames can be displayed in part of the screen while the current scene is displayed on the rest of the screen, or the full array of identification frames can be displayed by itself, as desired.

The video memory 48 contains sufficient storage for the twelve video pictures 56 on the auxiliary monitor 52. If the identification of color corrections for more than twelve scenes is desired, the video memory 48 may contain additional storage for the additional video pictures. That is, the video memory 48 may contain additional pages of memory. In order to move from one page of the video memory, with an associated display of up to twelve video pictures on the auxiliary monitor, to another page of video memory, with a different display of up to twelve video pictures on the auxiliary monitor, the "page up" and "page down" pushbuttons are employed. The "page up" and "page down" pushbuttons are located in the row of pushbuttons 36 in FIG. 4.

FIG. 7 of the drawings is a flow chart illustrating a computer program used to operate the "Call-A-Picture" feature of the invention. The routine is generally designated by the reference numeral 500.

Figure 7A:
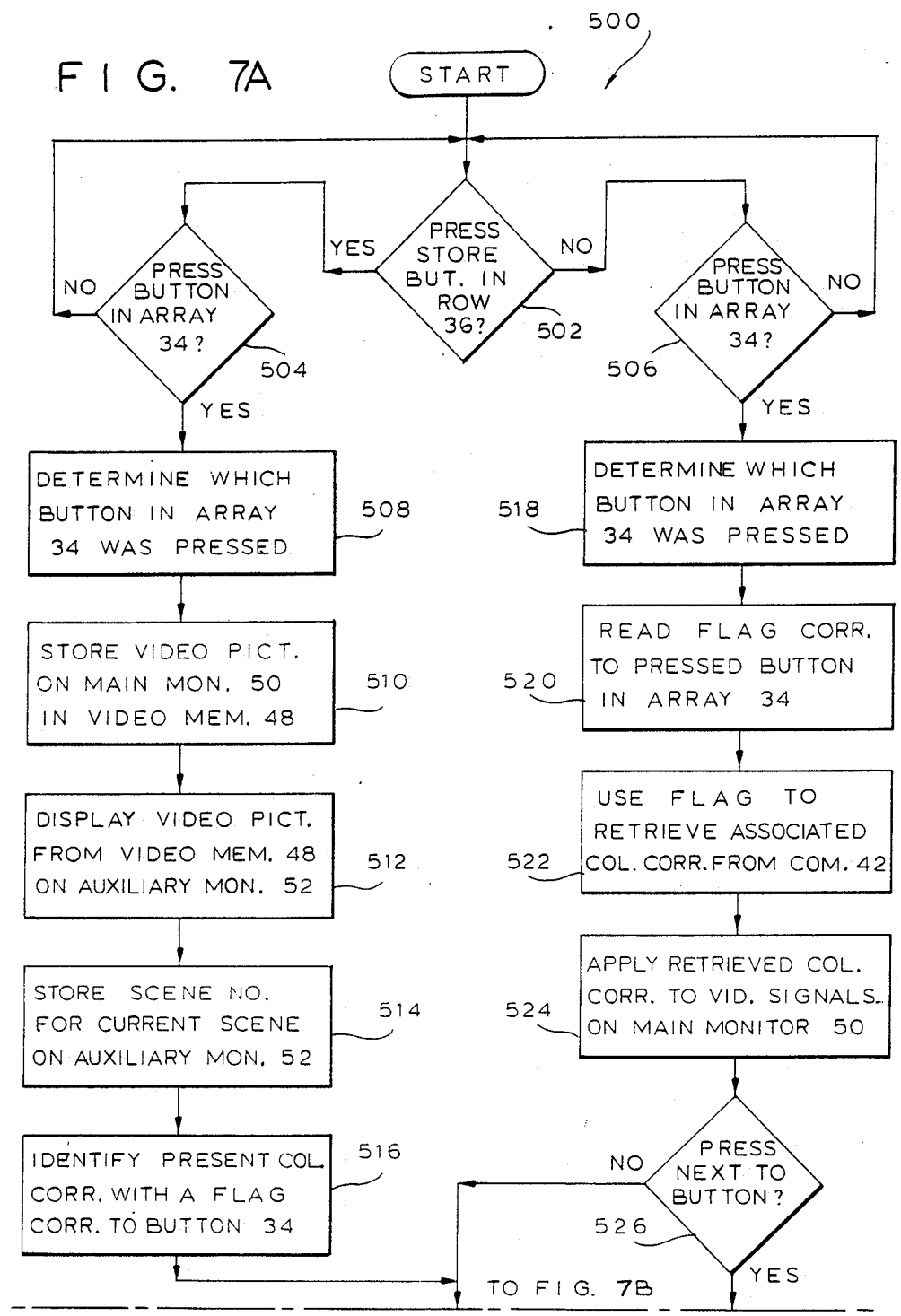

Initially, as shown in FIG. 7A, the routine checks to ascertain whether the "store" button in the row 36 (FIGS. 2 and 4) has been pressed, as indicated at 502. If so, the routine then checks to determine whether a button in the array 34 of buttons has been pressed, as denoted at 504. However, if the "store" button in the row 36 has not been pressed, the routine simply inquires whether a button in the array 34 (FIGS. 2 and 4) has been actuated, as indicated at 506. The left branch of the flowchart in FIG. 7A, starting with the decision block 504, may be considered as a "write" mode since video picture information is stored during this mode. Correspondingly, the right branch of the flowchart in FIG. 7A, starting with the decision block 506, may be considered as a "read" mode since video picture information is recalled during this mode.

Once the "store" button (FIG. 4) and a button in the array 34 (FIG. 4) have been pressed, the routine determines specifically which button in the array 34 was actuated, as shown at 508. Then, the routine stores the video signals for the video picture appearing on the main monitor 50 (FIG. 1) in the video memory 48 (FIG. 1), as illustrated at 510. Subsequently, the routine displays a video picture from the video memory 48 (FIG. 1) on the auxiliary monitor 52 (FIG. 1) in the location 56 (FIGS. 1 and 6) corresponding to the button in the array 34 that was just actuated, as indicated at 512. In addition, the routine stores the scene number for the current scene on the auxiliary monitor 52 in the numerical display directly beneath the appropriate location 56, as depicted at 514.

Moreover, the routine identifies the color corrections for the current scene with a flag corresponding to the button in the array 34 that was just pressed, as shown at 516. This flag will be used during the "read" mode in order to access these color corrections and recall them from the computer 42 (FIG. 1). For example, a button in the array 34 of buttons may be identified with a flag through the use of a suitable subroutine. A person having ordinary skill in the art would understand that various techniques may be employed to accomplish this task. Consequently, such steps will not be discussed herein detail.

Referring now to the right branch of the routine illustrated in FIG. 7A, i.e., the steps used in the "read" mode, this mode is entered by simply pressing a button in the array 34 of buttons (FIGS. 2 and 4), as shown by the decision block 506. Once this mode has been entered, the routine determines specifically which button in the array 34 was actuated, as indicated at 518. The routine then reads the flag corresponding to the button that was just pressed, as illustrated at 520.

Next, the routine uses the flag to retrieve the associated color corrections from the computer 42 (FIG. 1), as depicted at 522. For instance, a suitable subroutine may be called and utilized to retrieve the color corrections for the previous scene from the computer 42. A person having ordinary skill in the art would understand that various techniques may be employed to accomplish this task. Accordingly, such steps will not be discussed herein detail.

After the color corrections for the previous scene have been retrieved from the computer 42 (FIG. 1), they are applied to the uncorrected video signals from the video signal source 44 (FIG. 1), as denoted at 524, to produce color corrected video signals. These color corrected video signals are delivered to the main monitor 50 (FIG. 1), which then displays a color corrected picture.

Referring again to the right branch of the routine shown in FIG. 7A, the blocks below block 524 depict additional aspects of the "Call-A-Picture" feature of the invention.

Namely, the routine inquires whether the "next to" button in the row 36 of buttons (FIG. 4) has been pushed. If not, no further action is taken by the routine. However, if the "next to" button has been actuated, the routine stores the video signals for the video picture appearing on the main monitor 50 (FIG. 1) in the video memory 48 (FIG. 1), as designated at 528 (see 7B). The video picture on the main monitor 50 shows the effects of the recalled color corrections for the previous scene after they have been applied with or without modifications to the present scene. Specifically, the color corrections obtained through the steps shown by blocks 518, 520, 522, and 524 are applied to the video picture for the current scene, and then this color corrected video picture is stored in the video memory 48, as indicated at 528.

Still referring to FIG. 7B, subsequently, the routine displays the video picture that was just stored in the video memory 48 on the auxiliary monitor 52 (FIG. 1), as illustrated at 530. This video picture is displayed in a location 56 (FIGS. 1 and 6) that is adjacent to the location 56 corresponding to the button in the array 34 that was pressed to enter the "read" mode. The routine also rearranges the other video pictures on the auxiliary monitor 52, as shown at 532, if necessary, in order to properly position the miniaturized video picture for the present scene.

Figure 7B:
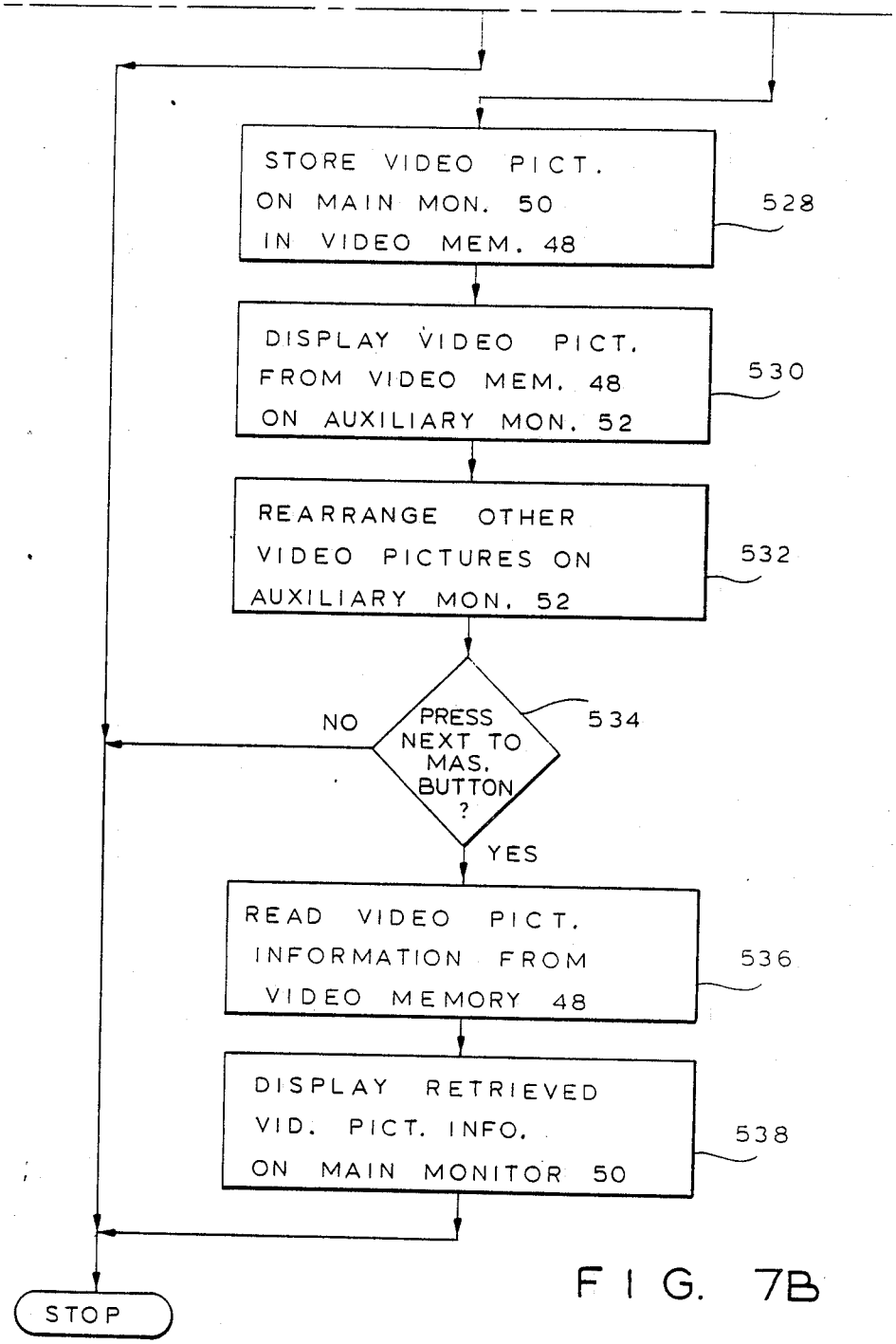

Blocks 534, 536, and 538 in FIG. 7B illustrate an additional aspect of the "Call-A-Picture" feature of the invention. Starting with the decision block 534 FIG. 7B, the routine ascertains whether the "next to master" button in the middle row 26 of buttons (FIG. 3) has been pushed. If not, the routine takes no further action. However, if the "next to master" button has been actuated, the routine reads the video picture information for two video pictures from the video memory 48 (FIG. 1), as indicated at 536. Namely, the video picture information for the picture that was stored during the steps designated by block 530 is read from the video memory 48, as is the video picture information for the location 56 corresponding to the button in the array 34 that was pressed to enter the "read" mode. The retrieved video picture information is displayed on the main monitor 50 (FIG. 1), as shown at 538. Accordingly, the operator may observe the effects of certain color corrections on both the present scene and a prior scene, and, as noted previously, these color corrections may be modified when they are applied to the present scene. This observation may be made on the main monitor 50 through the use of the "next to master" button in order to enable the operator to clearly view the two video pictures on an enlarged scale.

Figure 8B:
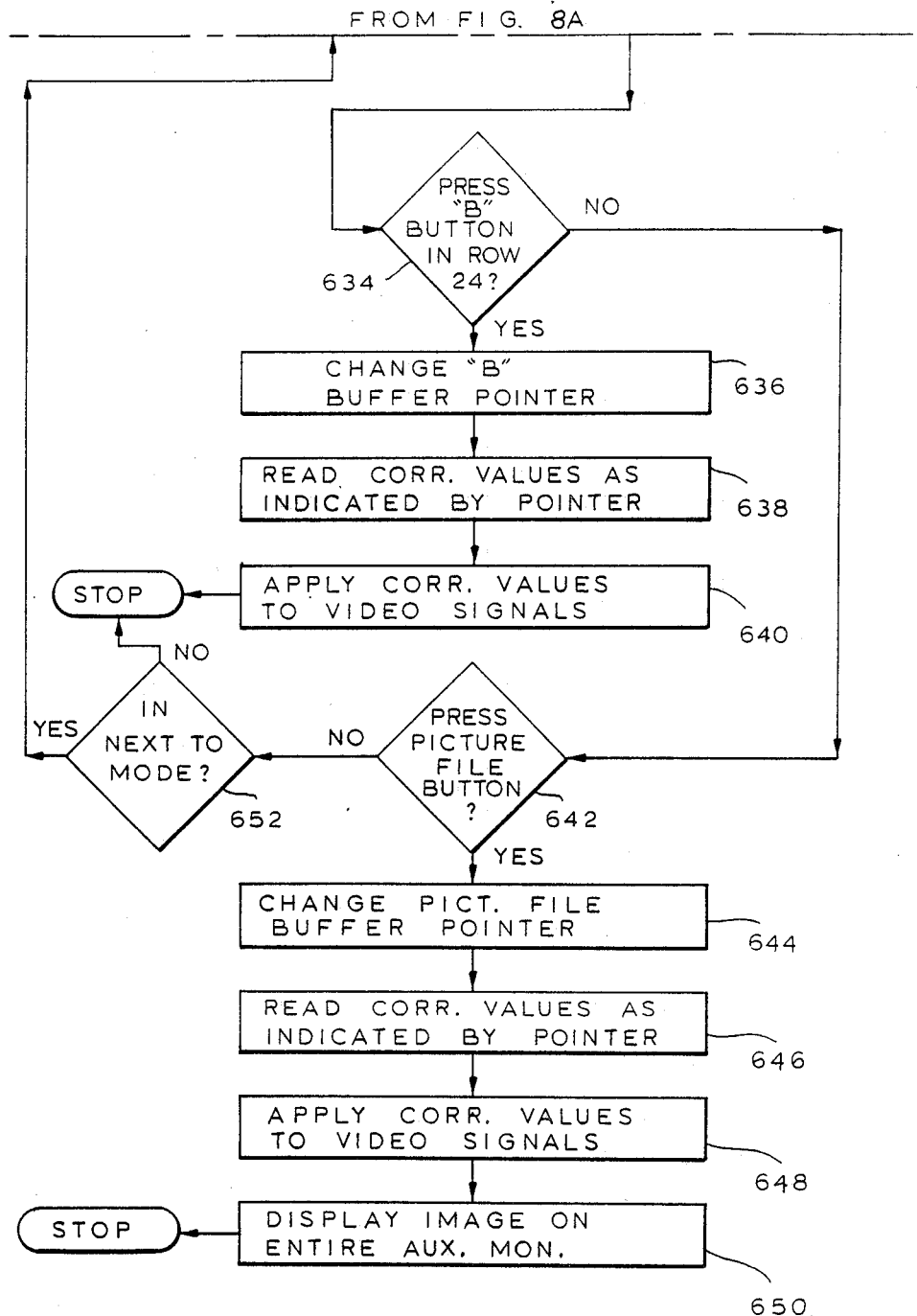

FIGS. 8A and 8B of the drawings is a flowchart illustrating another computer program that may be used to operate the "Call-A-Picture" feature of the invention. The routine is generally designated by the reference numeral 600 in FIG. 8A.

Initially, the routine checks to determine whether the "store" button in row 36 (FIGS. 2 and 4) has been pressed, as indicated at 602. If so, the routine then checks to determine whether a button in the array 34 of buttons (FIGS. 2 and 4) has been actuated, as denoted at 604. However, if the "store" button has not been pressed, the routine just inquires whether a button in the array 34 has been actuated, as indicated at 606. As in the flowchart of FIG. 7A, the left branch of the flowchart of FIG. 8A may be considered as a "write" mode, while the right branch of the flowchart may be considered as a "read" mode.

After the "write" mode has been entered by pressing the "store" button and then by pressing one of the buttons in the array 34, the routine determines exactly which button in the array 34 was pressed, as denoted at 608. The routine next displays the video picture from the main monitor 50 (FIG. 1) in a reduced form on the auxiliary monitor 52 (FIG. 1), as shown at 610. The reduced video picture is displayed in the location corresponding to the button in the array 34 that was just actuated. The routine then stores the present color corrections in a suitable location in the memory of the computer 42 (FIG. 1), as illustrated at 612. Specifically, a number of memory locations in the computer 42 have been allocated for the miniaturized video pictures that may be displayed on the auxiliary monitor 52. The storage step shown at 612 causes the present color corrections to be stored in the memory location corresponding to the button in the array 34 that was just pressed. This storage step is the last task performed in the "write" mode.

Referring now to the right branch of the routine illustrated in FIG. 8A, i.e., to the steps used in the "read" mode, this mode is entered merely by pressing a button in the array 34 of buttons (FIGS. 2 and 4), as shown by the decision block 606. Once this mode has been entered, the routine determines exactly which button in the array 34 was pressed as denoted at 614.

The routine then inquires whether the "next to" button in the row 36 (FIG. 4) has been pushed, as denoted at 616. If so, the routine forms a split screen on the auxiliary monitor 52, as indicated at 618. Subsequently, the routine checks which of several split screen options has been selected by the operator and then uses the appropriate split screen option to divide the display on the auxiliary monitor 52, as indicated at 620. For example, the screen of the auxiliary monitor may be divided into left and right halves, or into top and bottom halves. Additionally, the screen may be divided into three sections, with one video picture appearing in the center section and another video picture appearing in the two sections bordering the center section. Furthermore, the dividing line between the two portions of the screen may be positioned as desired by the operator.

The routine then ascertains whether the "next to" button has again been pressed, as indicated at decision block 622. If not, the routine repeats the steps in blocks 618 and 620. If the "next to" button has again been pressed, the routine restores the normal twelve-picture display on the auxiliary monitor 52, as shown at 624.

Referring to the right branch of the flowchart of FIG. 8A, if the routine is in the "read" mode and the "next to" button has not been actuated, the routine inquires whether the "A" button or the "B" button or the "picture file" button in the upper row of buttons 24 (FIG. 4) has been pressed, as indicated by the decision blocks 626, 634, and 642. (Blocks 634 and 642 are shown in FIG. 8B.)

Again referring to FIG. 8A, when the "A" button is actuated during the "read" mode, the routine changes the pointer associated with the "A" buffer, as designated at 628. That is, the routine causes the pointer for the "A" buffer to assume a value corresponding to the memory location in the computer 42 associated with the button in the array 34 that was pressed to enter the "read" mode. Then, the routine uses the pointer to read the appropriate color corrections from the computer 42, as illustrated at 630. The routine next applies these recalled color corrections to the uncorrected video signals from the video signal source 44, as indicated at 632, to produce color corrected video signals, which are displayed on the main monitor 50.

If the "A" button has not been pressed during the "read" mode, the routine inquires whether the "B" button has been pressed, as denoted at 634. If so, the routine carries out substantially the same steps as shown in the blocks 628, 630, and 632, in the blocks 636, 638, and 640.

If the "A" button and the "B" button have not been pressed during the "read" mode, the routine determines whether the "picture file" button in the upper row of buttons 24 (FIG. 4) has been actuated. This step is illustrated by the decision block 642. The purpose of the "picture file" button is to cause the selected miniature video picture in the twelve-picture display to be displayed over the entire area of the auxiliary monitor. Accordingly, when the "picture file" button has been pressed during the "read" mode, the routine changes the pointer for the "picture file" buffer, as designated at 644. The steps used to carry out the function denoted at block 644 are essentially the same as the steps used to carry out the functions denoted at the blocks 628 and 636. After the pointer has been changed, the routine uses the pointer to read the appropriate color corrections from the computer 42, as shown at 646. These retrieved color corrections are then applied to the uncorrected video signals from the video signal source 44, as indicated at 648, to produce color corrected video signals, which are displayed on the main monitor 50. Additionally, the routine displays the video picture associated with the button in the array 34 that was pressed to enter the "read" mode over the entire area of the auxiliary monitor 52, as illustrated at 650. In other words, the auxiliary monitor 52 shows the selected video picture on an enlarged scale, i.e., on a scale like that of the main monitor 50.

If neither the "A" button nor the "B" button nor the "picture file" button has been pressed during the "read" mode, the routine inquires whether the equipment is in the "next to" mode, as indicated at 652. The "next to" mode is entered by once pressing the "next to" button. If so, the routine again checks which of several split screen options has been selected by the operator and then uses the appropriate split screen option to divide or redivide the display on the auxiliary monitor 52. This step is designated at 620.

The "next to" button as described above in connection with the flowchart of FIG. 8A permits the operator to compare two full-size video pictures simultaneously on the auxiliary monitor. This is accomplished with a split screen. One video picture was previously stored and is now being recalled, while the other video picture is identical to the video picture on the main monitor. However, the video signals used to produce the latter video picture are subjected to essentially the same type of signal processing as the video signals used to produce the former video picture. In other words, the video signals producing the picture on the main monitor are initially converted into digital signals and subsequently converted back to analog signals. This signal processing technique results in pictures on the auxiliary monitor that are affected in the same way by the digitizing process. Thus, the operator is better able to observe the effects of certain color corrections on the present scene as compared to the prior scene. Furthermore, the use of two full-size video pictures permits the operator to better match the telecine position and/or size adjustments for the present scene with the prior scene.

The switching between the two video pictures on the auxiliary monitor may be accomplished while the signals are in their digital form. Consequently, differential distortions arising from conventional analog switching circuits, e.g. wiping circuits, are eliminated.

The video picture storage technique described above in connection with FIG. 8A, i.e., the technique in which specific memory locations in the computer 42 are allocated for color corrections associated with the miniature video pictures on the auxiliary display, may be thought of as "video scratch-pad memory". That is, the color corrections stored in the allocated memory locations are not necessarily related to color correction events. These color corrections may be accessed at random, with the miniature video pictures on the auxiliary display being useful to remind the operator of what these color corrections relate to. This feature permits the operator, on a random basis, to store and recall color corrections that were originally created on a temporary basis.

It can be seen from the foregoing that the invention meets the objectives stated above admirably. Apparatus and method are provided for quickly, easily and accurately comparing images from two different sources. The images can be displayed in a relatively large size for easy viewing, and are divided into uniformly interspersed segments so that individual components of an image in one frame can be compared with the corresponding parts of the same image from another frame because the images are near or coincident with one another.

The position and size of an image easily can be adjusted so as to accurately locate an image in each scene of a program, thus facilitating inserts and other graphic modifications.

Color matching can be performed quickly and easily because segments of the two areas to be compared can be viewed side-by-side and in minute detail. Specific areas or zones of the image whose color is to be changed can be corrected separately from the rest of the images, either by the precise color selection means disclosed in this and the prior patents and applications which are parent to this application, or by the use of a window, or by both techniques. Therefore, color matching can be done with unprecedented ease and accuracy.

Although particular illustrative embodiments of the present invention have been described herein with reference to the accompanying drawings, the present invention is not limited to these particular embodiments. Various changes and modifications may be made thereto by those skilled in the art without departing from the spirit or scope of the invention, which is defined by the appended claims.

We claim:

1. Apparatus for comparing video images, said apparatus comprising, means for receiving video signals representing images in a plurality of different frames of image record media, interweaving the signals representing said different frames in a repetitively alternating pattern, and displaying on a video display device the video pictures formed by said interweaving said video signals being digital and representing individual pixels of the video picture.

2. Apparatus as in claim 1 including means for changing a parameter of an image in at least one of said frames, said parameter being selected from the group consisting of size, vertical position, horizontal position, and horizontal or vertical compression.

3. Apparatus as in claim 1 in which said means comprises analog-to-digital conversion means for converting analog video signals into digitized video signals, digital storage means for storing the digitized video signals for at least one of said frames, means for reading out the signals from said storage and means and, means for delivering to the receiving means the signals read out from said memory and the signals from said analog-to-digital conversion means.

4. Apparatus as in claim 3 in which said signals read out from said memory represent signals previously delivered from an analog video signal source, converted by said converter, and stored in said memory, said video signal source being selected from the group consisting of a telecine and a video record player.

5. Apparatus for comparing video images, said apparatus comprising, means for receiving video signals representing images in a plurality of different frames of image record media, interweaving the signals representing said different frames, and displaying on a video display device the video pictures formed by said interweaving, in which said video signals are digital and represent individual pixels of the video pictures, and in which pixels from each of said frames are located in an evenly repetitive alternating pattern along each horizontal trace.

6. Apparatus as in claim 5 in which the pattern along each of selected ones of said horizontal traces is offset horizontally from that of an adjacent trace, said selected horizontal traces being arranged with the other horizontal traces in an evenly repetitive alternating vertical pattern.

7. Apparatus as in claim 6 in which said patterns are the same.

8. Apparatus for comparing video images, said apparatus comprising, means for receiving video signals representing images in a plurality of different frames of image record media, interweaving the signals representing said different frames, and displaying on a video display device the video pictures formed by said interweaving, in which said signals are interwoven so that the pixels in said picture form a checkerboard pattern with each successive square of the checkerboard being composed of at least one pixel from a different one of said frames.

9. Apparatus as in claim 8 in which each of said squares of said checkerboard is composed of a predetermined number of pixels from one of said frames, the numbers in the horizontal and vertical directions being equal.

10. Apparatus for comparing video images, said apparatus comprising, means for receiving video signals representing images in a plurality of different frames of image record media, interweaving the signals representing said different frames, and displaying on a video display device the video pictures formed by said interweaving, and means for altering the color of an image in at least one of said frames in comparison with an image from another of said frames.

11. A method of comparing video images from different frames of image record media, said method comprising the steps of interweaving elements from one of said frames with elements from the other of said frames in a repetitively alternating pattern said elements being formed by individual pixels corresponding to digital video signals said frames having common subject matter to be compared, and comparing the common subject matter from said different frames.

12. A method as in claim 11 in which said common subject matter is the same image which appears in each of said frames.

13. A method as in claim 12 including modifying one of said images to change at least one of its parameters, said parameter being selected from the group consisting of the size, position, vertical and horizontal compression, and color characteristics of said image.

14. A method as in claim 13 in which said changing step comprises changing said size and/or said position in order to align said one image with the other.

15. A method as in claim 11 including the steps of digitizing analog video signals from an analog video source by means of an analog to digital converter, storing the digitized signals in a digital memory, utilizing said converter to digitize other analog video signals, sending digital signals alternatingly from said memory, and said converter to an output terminal, converting the digital signals at said output terminal into analog signals, transmitting said analog signals, in a suitable form to a monitor for display.

16. A method of comparing video images from different frames of image record media, said method comprising the steps of, interweaving elements from one of said frames with elements from the other of said frames, each of said frames having the same image, comparing said images from said different frames, modifying one of said images to change at least one of its parameters, said parameter being selected from the group consisting of the size, position, vertical and horizontal compression, and color characteristics of said image, said changing step comprises changing said size and/or said position in order to align said one image with the other, providing digital signals each representing a pixel in one of said frames, and interweaving the digital signals to form said elements into a checkerboard pattern, each square of the pattern comprising at least one pixel from one of said frames, adjacent squares being composed of pixels from different ones of said frames.

17. A method of comparing video images from different frames of image record media, said method comprising the steps of, interweaving elements from one of said frames with elements from the other of said frames, said frames having common subject matter to be compared, comparing the common subject matter from said different frames, the subject matter of one frame having a color to be matched to that of the corresponding subject matter in the other frames, said elements being arranged to be readily visible to the naked eye, and altering the color of the subject matter of said one frame to match the color of the other frame.

18. A method as in claim 17 said interweaving step comprising forming staggered groups of said elements offset from one another in an alternating pattern.

* * * * *

UNITED STATES PATENT AND TRADEMARK OFFICE
CERTIFICATE OF CORRECTION

PATENT NO. : 4,954,883

DATED : September 4, 1990

INVENTOR(S) : Armand Belmares-Sarabia and Stanley J. Chayka

It is certified that error appears in the above-identified patent and that said Letters Patent is hereby corrected as shown below:

On the title page:
In the identification of the inventors on the first page change "Sarabis" to --Sarabia--;

Signed and Sealed this

Twenty-fourth Day of December, 1991

Attest:

HARRY F. MANBECK, JR.

Attesting Officer    Commissioner of Patents and Trademarks